United States Patent
Fay

(10) Patent No.: US 9,912,456 B2
(45) Date of Patent: Mar. 6, 2018

(54) METHOD AND APPARATUS FOR TRANSMITTING A-PRIORI INFORMATION IN A COMMUNICATION SYSTEM

(71) Applicant: Sony Corporation, Tokyo (JP)

(72) Inventor: Luke Fay, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/016,450

(22) Filed: Feb. 5, 2016

(65) Prior Publication Data

US 2016/0173254 A1    Jun. 16, 2016

Related U.S. Application Data

(63) Continuation of application No. 14/566,574, filed on Dec. 10, 2014, now Pat. No. 9,326,295.

(51) Int. Cl.
| | | |
|---|---|---|
| *H04B 1/69* | (2011.01) | |
| *H04L 5/00* | (2006.01) | |
| *H04W 72/10* | (2009.01) | |
| *H04L 27/26* | (2006.01) | |

(52) U.S. Cl.
CPC .......... *H04L 5/0048* (2013.01); *H04L 5/0016* (2013.01); *H04L 27/2613* (2013.01); *H04L 27/2626* (2013.01); *H04L 27/2647* (2013.01); *H04L 27/2666* (2013.01); *H04W 72/10* (2013.01); *H04B 2001/6912* (2013.01)

(58) Field of Classification Search
USPC ......... 375/139, 340, 299; 370/330, 338, 311
See application file for complete search history.

(56) References Cited

U.S. PATENT DOCUMENTS

| | | | | |
|---|---|---|---|---|
| 6,546,062 B1* | 4/2003 | Du | .............. | H04B 1/7075 370/328 |
| 8,488,539 B2* | 7/2013 | Liao | ............ | H04L 27/2621 370/319 |
| 2005/0174284 A1 | 8/2005 | Abraham et al. | | |
| 2005/0271150 A1* | 12/2005 | Moore | ............ | H04B 1/71632 375/259 |
| 2005/0276347 A1* | 12/2005 | Mujtaba | ............ | H04B 7/0684 375/299 |
| 2007/0147226 A1 | 6/2007 | Khandekar et al. | | |
| 2007/0200639 A1* | 8/2007 | Park | ............ | H03J 7/065 331/16 |
| 2009/0245287 A1 | 10/2009 | Mueller | | |

(Continued)

FOREIGN PATENT DOCUMENTS

WO    WO 2007/050921 A2    5/2007

OTHER PUBLICATIONS

International Search Report dated Mar. 4, 2016 in PCT/JP2015/005905.

*Primary Examiner* — Eva Puente
(74) *Attorney, Agent, or Firm* — Oblon, McClelland, Maier & Neustadt, L.L.P.

(57) ABSTRACT

Methods and apparatuses are provided for transmitting and receiving a-priori information. The transmitting method includes generating, by circuitry of a transmission apparatus, the a-priori information based on a sampling frequency and a channel bandwidth of a signal to be transmitted. The a-priori information is appended to a data signal by the circuitry. The circuitry transmits the data signal including the appended a-priori information to a reception apparatus.

16 Claims, 13 Drawing Sheets

(56) References Cited

U.S. PATENT DOCUMENTS

| | | |
|---|---|---|
| 2009/0268825 A1 | 10/2009 | Sakai et al. |
| 2010/0158173 A1 | 6/2010 | Lee et al. |
| 2010/0246664 A1* | 9/2010 | Citta ............... H03M 13/00 375/240.01 |
| 2010/0260159 A1* | 10/2010 | Zhang ............... H04W 28/06 370/338 |
| 2010/0261677 A1 | 10/2010 | Langkopf et al. |
| 2011/0007627 A1 | 1/2011 | Lee et al. |
| 2011/0013583 A1* | 1/2011 | Yang ............... H04L 5/0023 370/330 |
| 2011/0019694 A1 | 1/2011 | Kwon et al. |
| 2013/0230091 A1 | 9/2013 | Chini et al. |
| 2014/0092845 A1 | 4/2014 | Yamada et al. |
| 2014/0294002 A1 | 10/2014 | Kim et al. |
| 2015/0016324 A1* | 1/2015 | Yoon ............... H04W 52/0235 370/311 |
| 2015/0304148 A1* | 10/2015 | Vermani ............ H04L 27/2649 375/340 |
| 2015/0365266 A1* | 12/2015 | Zhang ............... H04L 1/0057 370/330 |

\* cited by examiner

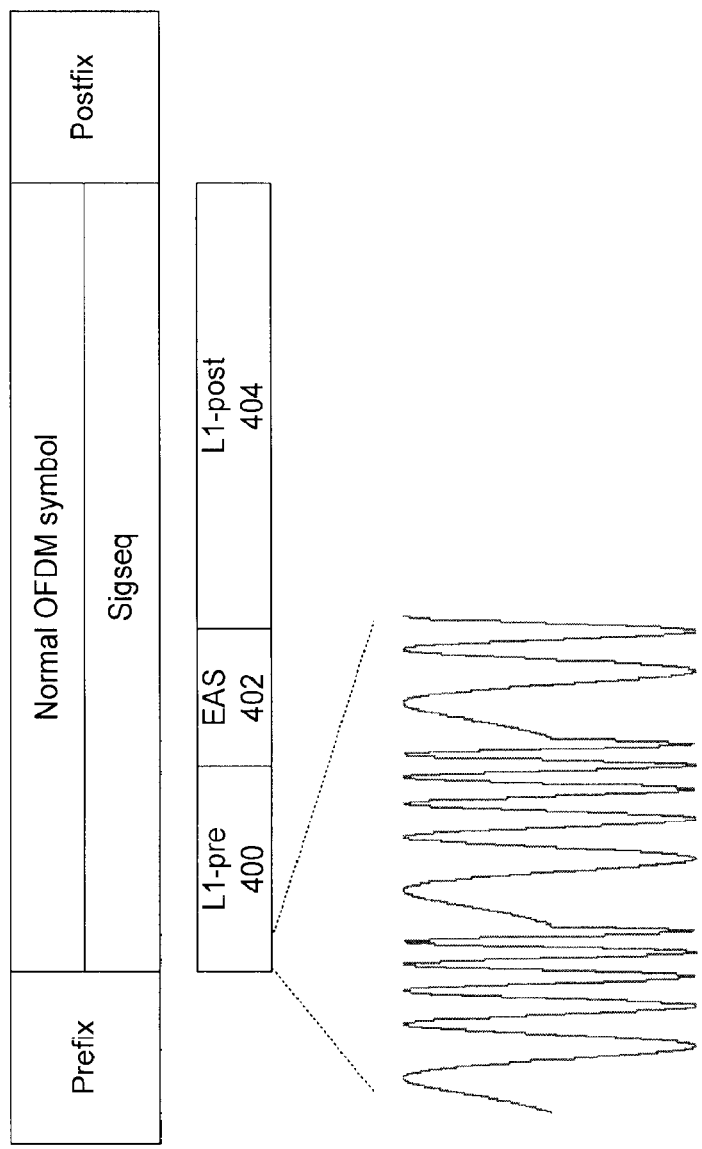

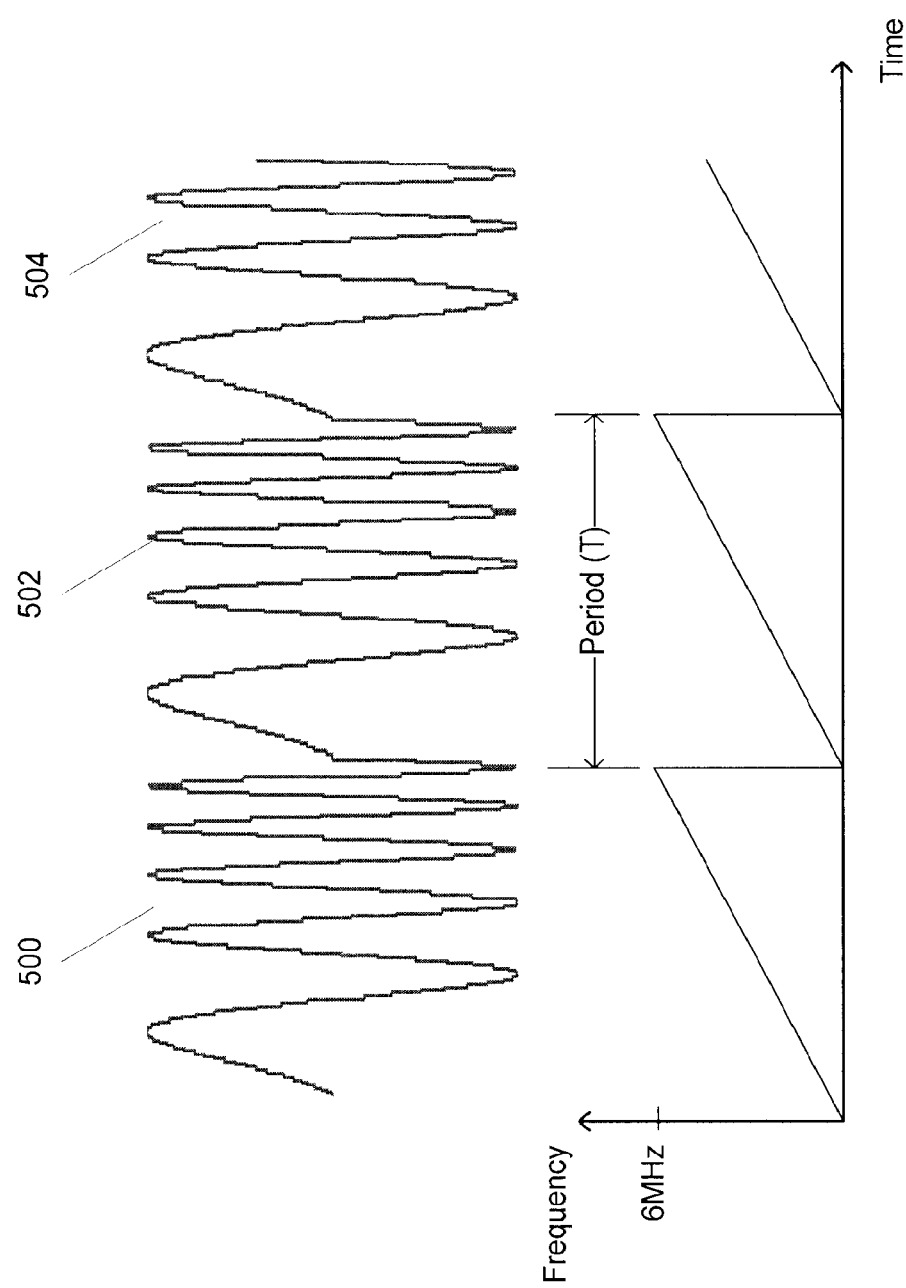

METHOD AND APPARATUS FOR TRANSMITTING A-PRIORI INFORMATION IN A COMMUNICATION SYSTEM

CROSS-REFERENCE TO RELATED APPLICATIONS

This application is a continuation of U.S. application Ser. No. 14/566,574, filed Dec. 10, 2014, the entire content of which is incorporated herein by reference.

TECHNICAL FIELD

The present disclosure relates to transmitting and receiving a-priori information in a communication system.

BACKGROUND

During the last decade, terrestrial broadcasting has evolved from analog to digital. There exist several wideband digital communication techniques depending on a broadcasting standard used. For example, direct sequence spread spectrum (DSSS) and orthogonal frequency-division multiplexing (OFDM) are one of the latest schemes used in wideband digital communication systems, whether wireless or over copper wires. OFDM is a method of encoding digital data on multiple carrier frequencies and is used in applications such as digital television and audio broadcasting, DSL Internet access, wireless networks, power line networks, and 4G mobile communications.

Current digital broadcasting systems use fixed knowledge of a channel bandwidth at a receiver. In addition to the specific information about the communications technology used, the receiver needs the channel bandwidth or a sampling frequency to demodulate received signals. Due to technical advancements, the channel bandwidth and the sampling frequency may change over the years. As recognized by the present inventor, there is a need to facilitate changes in channel bandwidth and/or sampling frequency.

SUMMARY

According to an embodiment of the present disclosure, there is provided a method of a transmission apparatus for transmitting a-priori information. The method includes generating, by circuitry of a transmission apparatus, the a-priori information based on a sampling frequency and a channel bandwidth of a signal to be transmitted. The a-priori information is appended to a data signal by the circuitry. The circuitry transmits the data signal including the appended a-priori information to a reception apparatus According to an embodiment of the present disclosure, there is provided a transmission apparatus that includes circuitry configured to generate a-priori information based on a sampling frequency and a channel bandwidth of a data signal to be transmitted, append the a-priori information to the data signal, and transmit the data signal including the appended a-priori information to a reception apparatus.

According to an embodiment of the present disclosure, there is provided a method of a reception apparatus for detecting a-priori information. The method includes receiving, by circuitry of a reception apparatus, a transmitted signal. The transmitted signal includes a-priori information appended to a data signal. The a-priori information included in the transmitted signal is detected by the circuitry. Further, the circuitry determines a sampling frequency and a channel bandwidth associated with the transmitted signal based on the detected a-priori information.

According to an embodiment of the present disclosure, there is provided a reception apparatus. The reception apparatus comprises circuitry configured to receive a transmitted signal. The transmitted signal includes a-priori information appended to a data signal. The circuitry detects the a-priori information included in the transmitted signal and determines a sampling frequency and a channel bandwidth associated with the transmitted signal based on the detected a-priori information.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 4 illustrates a preamble proposed by SONY corporation that includes a-priori information according to one embodiment;

FIG. 5A illustrates a chirp signal according to one embodiment;

DETAILED DESCRIPTION

Figure 1:
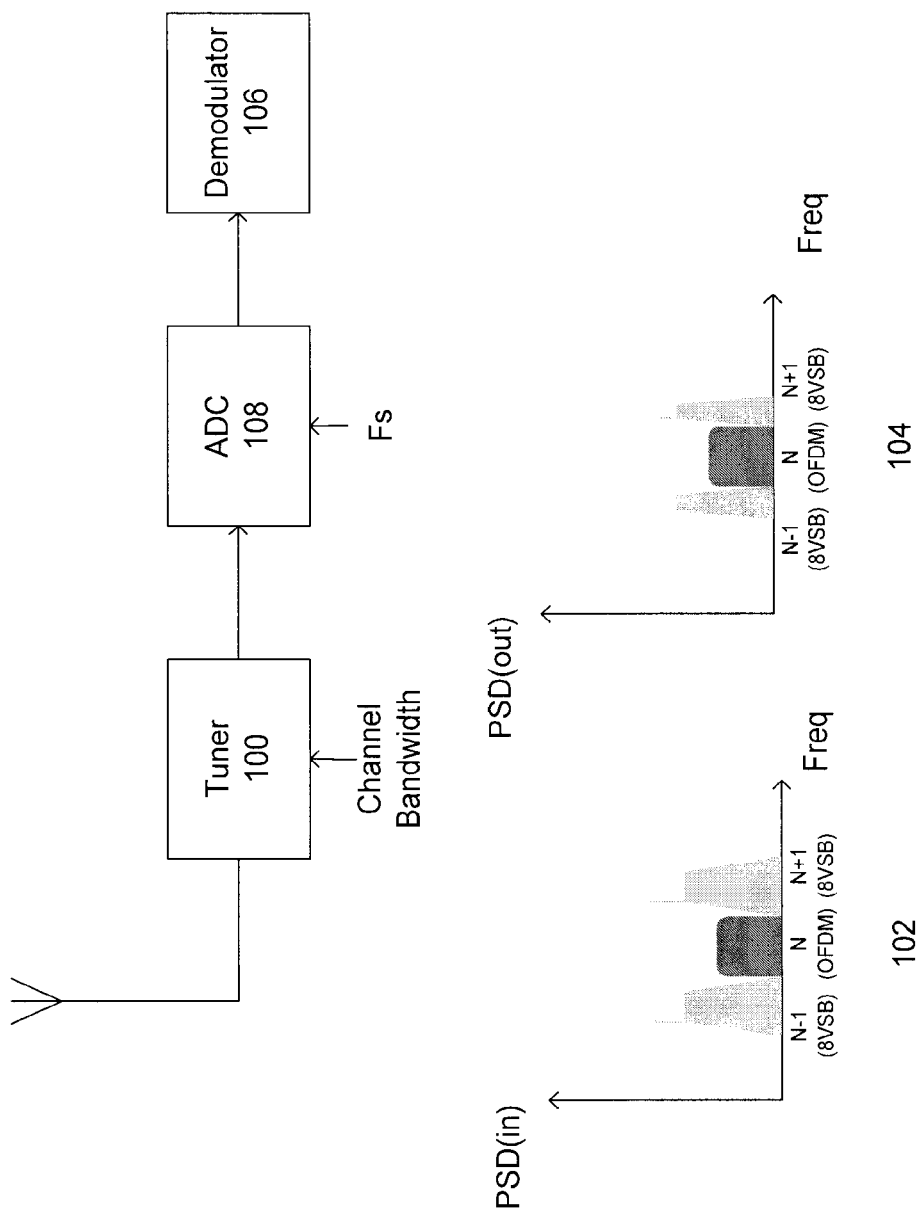
FIG. 1 illustrates portions of a reception apparatus according to one embodiment.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As technology advances, channel bandwidths and/or sampling frequencies used to communicate data may change. These changes may result from factors such as a change in communication scheme (e.g., different broadcasting techniques) or other criteria (e.g., service provider specification). For example, the service provider may choose an appropriate channel bandwidth for broadcasting 4K content or mobile content. In another example, a service provider may control several adjacent channels and could benefit from channel bonding.

In the last decade for example, the IEEE 802.11 family consists of many versions (a, b, g, n, ac, etc.) where the modulation scheme is either OFDM or DSSS, the center frequency is either 2.4 GHz or 5 GHz, the sampling frequency or data rate changed from 1 Mbps to 780 Mbps, and the bandwidth has changed from 20 MHz to 160 MHz.

As the channel bandwidth and/or sampling frequency changes, devices are typically replaced to take advantage of the technological advances. However, replacement of such devices for each technological improvement is not only inflexible but costly and wasteful. Thus, there is a need for indicating a-priori information, including the bandwidth and sampling frequency, to account for different channel bandwidth options because an initially set sampling frequency and bandwidth may not be constant through the years, for example as apparent from the different versions of 802.11. Embodiments of the present disclosure address these problems by providing the channel bandwidth, sampling frequency, and/or multiplexing frequency to the reception apparatus. This information may be provided along with, a separately from, an associated data stream.

The channel bandwidth and sampling frequency are included in a-priori information and are needed by the reception apparatus to demodulate a received signal. Further, the a-priori information optionally includes the multiplexing technique. In certain embodiments of the present disclosure, the-priori information is transmitted with the signal. However, the a-priori information may be provided separately from the signal, such as via a predetermined channel or by a predetermined server on the Internet. The predetermined server may be a server that provides software updates to the reception apparatus, provided by a service provider, or provided by specified entity such as the FCC.

In certain embodiments, a-priori information is transmitted using a technique that does not require prior knowledge of the channel bandwidth and/or the sampling frequency by the reception apparatus. The a-priori information contains one or a combination of channel bandwidth and the sampling frequency. The a-priori information is obtained before starting decoding at the reception apparatus. The reception apparatus first processes the a-priori information to extract, or otherwise determine, the channel bandwidth and the sampling frequency. The channel bandwidth and the sampling frequency are then used in the decoding of digital information. The proposed method is flexible and can be used with a variety of communication standards.

FIG. 1 illustrates components of a reception apparatus according to one embodiment. A tuner 100 selects the radio frequency (RF) of a center channel from within a band of transmitted RF signals. The tuner 100 rejects the unwanted out-of-band signals. However, some channels adjacent to the center channel are also received. Graph 102 represents power spectral density (PSD) of the received RF signals. Graph 104 represents the PSD at the output of the tuner 100. The center channel is denoted by N. As shown in the graph 104, some of the frequencies adjacent to the center channel N, are present at the output of the tuner 100. Some portion of the neighboring channels (N−1) and (N+1) remain due to the non-ideal nature of the band pass filter in the tuner 100.

The output signal from the tuner 100 is fed to an analog to digital converter (ADC) 108. The ADC 108 needs the sampling frequency to perform the analog to digital conversion. The output signal from the ADC 108 is fed to the demodulator 106. The demodulator 106 separates a standard baseband signal from the RF carrier that was used to transmit it through a communication medium, for example air or a coaxial cable. Using the standard developed by the Advanced Television Systems Committee (ATSC), the bandwidth is fixed as regulated and thus known to the reception apparatus. Once the tuner 100, is tuned to the desired frequency all of the energy in the bandwidth is considered desired information. In current television systems, the bandwidth is hardcoded by the manufacturer based on one or more standards implemented where the television system is to be used. Because the bandwidth is known, the sampling frequency can be determined.

Figure 2:
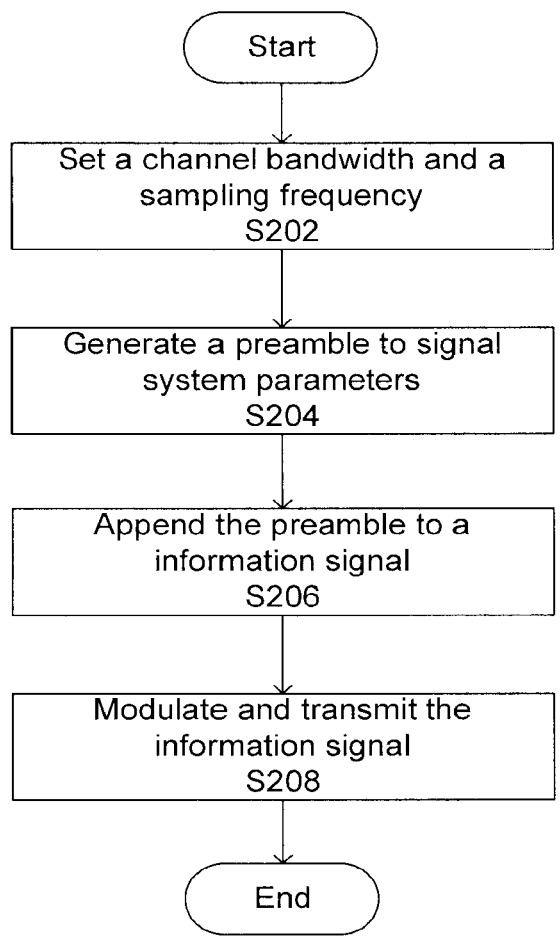
FIG. 2 illustrates a flow diagram of an exemplary method for transmission of a-priori information.

FIG. 2 illustrates a flow diagram of an exemplary method of a transmission apparatus for transmitting a-priori information. At step S202, a user sets one or a combination of a channel bandwidth and a sampling frequency. The user may be an operator of a broadcasting station. For example, a broadcaster may own three adjacent channels and may decide to combine the bandwidth of the channels. The transmission apparatus may broadcast digital television broadcast signals in accordance with, for example, standards set by the ATSC. At step S204, the transmission apparatus generates a preamble. In one embodiment, the preamble includes the a-priori information. The preamble may include a very small bandwidth signal that carries information, (e.g., 10 bits-5 bits for sampling frequency, 5 bits for channel bandwidth).

The signal may be put on continuous pilots. In broadcasting systems, a pilot signal is a signal, usually a single frequency, transmitted over a communications system for supervisory, control, equalization, continuity, synchronization, or reference purposes. The continuous pilots have a known constant value that corresponds to specific frequencies. In one embodiment, a phase change between a previous data carrier and the continuous pilot may indicate "−1" and no phase change may indicate "+1". The sampling frequency and the channel bandwidth are represented by their binary word equivalent (e.g., the 10 bits described above). In one embodiment, the zero may be mapped to "+1" and the one to "−1". In other embodiments the phase change indications and/or the mapping may be reversed. The number of continuous pilots corresponds to different mode such as 8K, 16K, etc.

The a-priori information may be a chipped sequence with Gold codes that rides below the noise. Gold codes are binary sequences that are highly orthogonal to one another. The Gold codes strongly correlate, when they are exactly aligned. The Gold codes are commonly used in satellite navigation and in code division multiple access (CDMA) communication. The a-priori information is coded and then the coded a-priori information is sent on the continuous pilots as explained above. The coded a-priori information can be accumulated in time with a known Gold code or the like. Extracting the a-priori information involves an FM demodulator adding accumulators in time with a known code that has to vary across Doppler offsets and chip sequence offsets and chip sequence offsets, which can add to channel change time.

In one embodiment, the a-priori information may be used with coded orthogonal frequency division multiplexing (COFDM) based systems and the a-priori information is transmitted in a chirp signal. In other embodiments, the a-priori information may be transmitted using amplitude diversity.

The preamble may also include control, synchronization, information, or other signaling data as would be understood by one of ordinary skill in the art. At step S206, the preamble is appended to, or otherwise inserted into, an information signal or frame. In another embodiment, the a-priori information is inserted into a portion of the information signal or frame. At step S208, the signal (e.g., a digital television signal) generated at step S206 is modulated and transmitted according to a communication method as explained in detail later.

Figure 3:
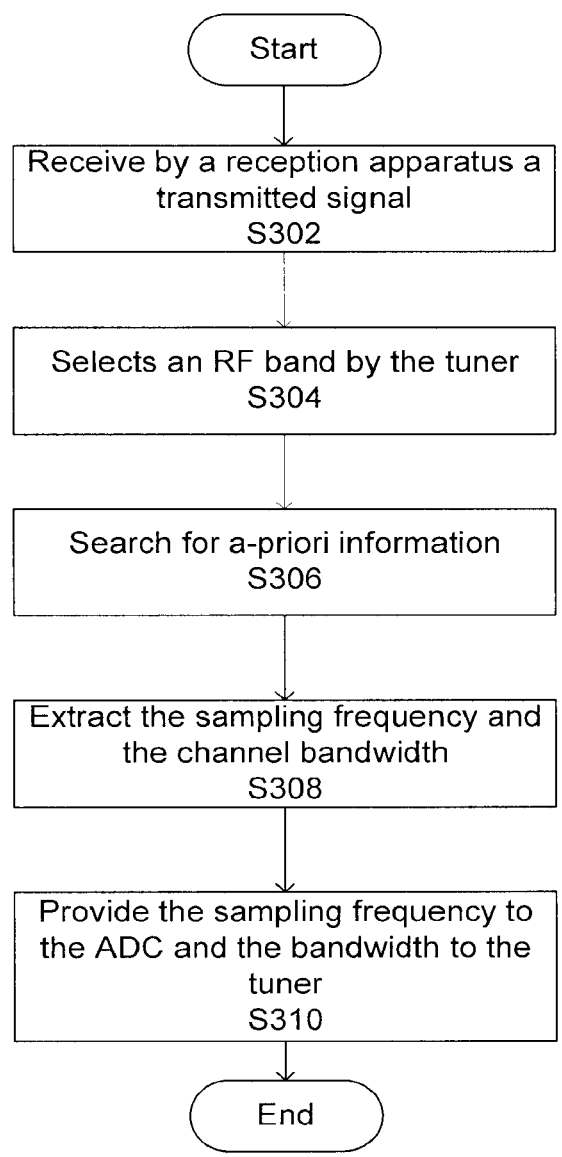
FIG. 3 illustrates a flow diagram of an exemplary method for reception of a-prior information.

FIG. 3 illustrates a flow diagram of an exemplary method of a reception apparatus for receiving a-priori information. At step S302, a signal is received by the reception apparatus. For example, the reception apparatus receives a digital television broadcast signal transmitted at step S208 through a wireless channel (e.g., a terrestrial broadcast channel). The digital television broadcast signal includes audio/video content. At step S304, the tuner selects an RF band (e.g., 20 MHz of UHF, VHF). At step S306, the reception apparatus searches for, or otherwise detects, the a-priori information, as will be explained later. At step S308, the a-priori information is extracted from the signal (e.g., from the preamble). The extraction method depends on the type of method used to transmit the a-priori information such as chirp signal, Gold code, QPSK codes, etc. The reception apparatus may use a look-up table to obtain the channel bandwidth and the sampling frequency based on the extracted a-priori information. At step S310, the sampling frequency is provided to the ADC. The channel bandwidth is provided to the tuner.

In one embodiment, the preamble and the a-priori information signal described above are included in a digital television signal transmitted in a broadcasting system that employs a COFDM scheme. COFDM is the same as OFDM except that forward error correction is applied to the signal before transmission. OFDM is utilized in the terrestrial digital TV broadcasting system DVB-T (used in Europe) and integrated Services Digital Broadcasting for Terrestrial Television Broadcasting ISDB-T (used in Japan). COFDM is expected to be used in the future implementation of ATSC 3.0, which is now under discussion. COFDM is a multi-carrier modulation technique that can provide good performance in some wireless environments. In COFDM, the available bandwidth is divided into several orthogonal frequency sub-bands, which are also called sub-carriers. The partial allocation of the data payload to each subcarrier protects it against frequency selective fading. The number of sub-carriers may be dependent on the standard used. For example, Digital Video Broadcasting for Handhelds (DVB-H) uses 1705, 3409, or 6817 sub-carriers depending on the mode of operation. ISDB-T uses 256, 512, or 1024 depending on the mode of operation.

FIG. 4 illustrates a preamble proposed by SONY Corporation that includes a-priori information according to one embodiment. However, it should be noted that the a-priori information may be inserted into any other type of preamble or other portions of a transmitted signal. The a-priori information is represented by one or more chirps. The preamble includes a L1 pre-signaling section 400, an emergency alert system (EAS) section 402, and a L1 post-signaling section 404. As shown the a-priori information signal is inserted at the beginning of the L1 pre-signaling section 400 according to one embodiment. However, the a-priori information may be inserted in any other portion of the preamble such as between any of the preamble sections or after the L1 post-signaling section.

A reception apparatus begins to demodulate the incoming signal after detecting the preamble or GI which indicates the start of a COFDM frame. The reception apparatus may use autocorrelation to find the start of the frame as the GI is a repeated portion of the frame data. Inter symbol interference (ISI) may be canceled completely when the cyclic prefix guard interval has a duration equal to or larger than the channel delay spread. The CP is discarded at the reception apparatus, because it is only used to cancel the effect of the ISI. The frame data may be encoded depending on the system used. For example, the data may be BPSK, QPSK or QAM modulated. For example, in DVB-T2, the subcarrier modulation scheme may be QPSK, 16-QAM, 64-QAM or 256-QAM.

In one embodiment, the preamble signal generated at step S204, includes a chirp signal. The chirp signal is a signal that includes one or more chirp bursts in which the frequency increases (up-chirp) or decreases (down-chirp) with time. A linear chirp may be used. The chirp signal may be expressed as:

$$f(t)=f_0+kt$$

where $f_0$ is the starting frequency and k is the chirp rate and may be expressed as:

$$k = \frac{f_1 - f_0}{t_1}, \quad (1)$$

where $f_1$ is the final frequency of the chirp at time $t_1$. The chirp signal is similar to a radar chirp in one embodiment.

FIG. 5A illustrates a chirp signal according to one embodiment. The starting frequency or a burst may be chosen to be equal to a predetermined value. The predetermined value may be equal to a predetermined lowest channel bandwidth, for example as specified by a predetermined broadcasting standard (e.g., 5 MHz). The predetermined value may be stored in a corresponding memory of the transmission and the reception apparatus. The predetermined value may also be taken to equal to zero. The chirp rate, which represents the rate of frequency increase, may be chosen based on the sampling frequency. The final (highest) frequency is chosen to be equal to the channel bandwidth obtained at step S202. A slope is defined as the difference between the final frequency of the chirp minus the initial frequency of the chirp over the time span of a burst (chirp period). For example, the chirp signal may start with a frequency of 0 MHz ($f_0$=0 MHz) to the final (highest) frequency of 6 MHz ($f_1$=6 MHz) which represents the channel bandwidth. The chirp rate is taken to be 48/7, which represents the sampling frequency $f_s$. Thus, the chirp signal frequency should be varied from 0 MHz to 6 MHz in a period of $$T = \frac{f_1 - f_0}{f_s} = \frac{6-0}{48/7} = 0.875 \text{ μs}.$$

The chirp signal may be generated digitally using a digital signal processor (DSP) and a DAC using a direct digital synthesizer. Two or more bursts may be added to the preamble of every frame or every Nth frame (where N is equal to 2 or greater). In FIG. 5A, two complete bursts 500, 502 are shown. Also, a partial burst 504 is shown.

The number of bursts may be based on the desired preamble size. The reception apparatus may use multiple bursts to identify the boundaries of a burst. The reception apparatus detects a change in the frequency to identify the beginning of the burst. Once the beginning of the burst is identified, the reception apparatus can detect the maximum frequency and the period of the burst. For example, the reception apparatus determines a starting boundary of the second burst using the first burst, and an ending boundary of the second burst using the following partial burst.

Figure 5B:
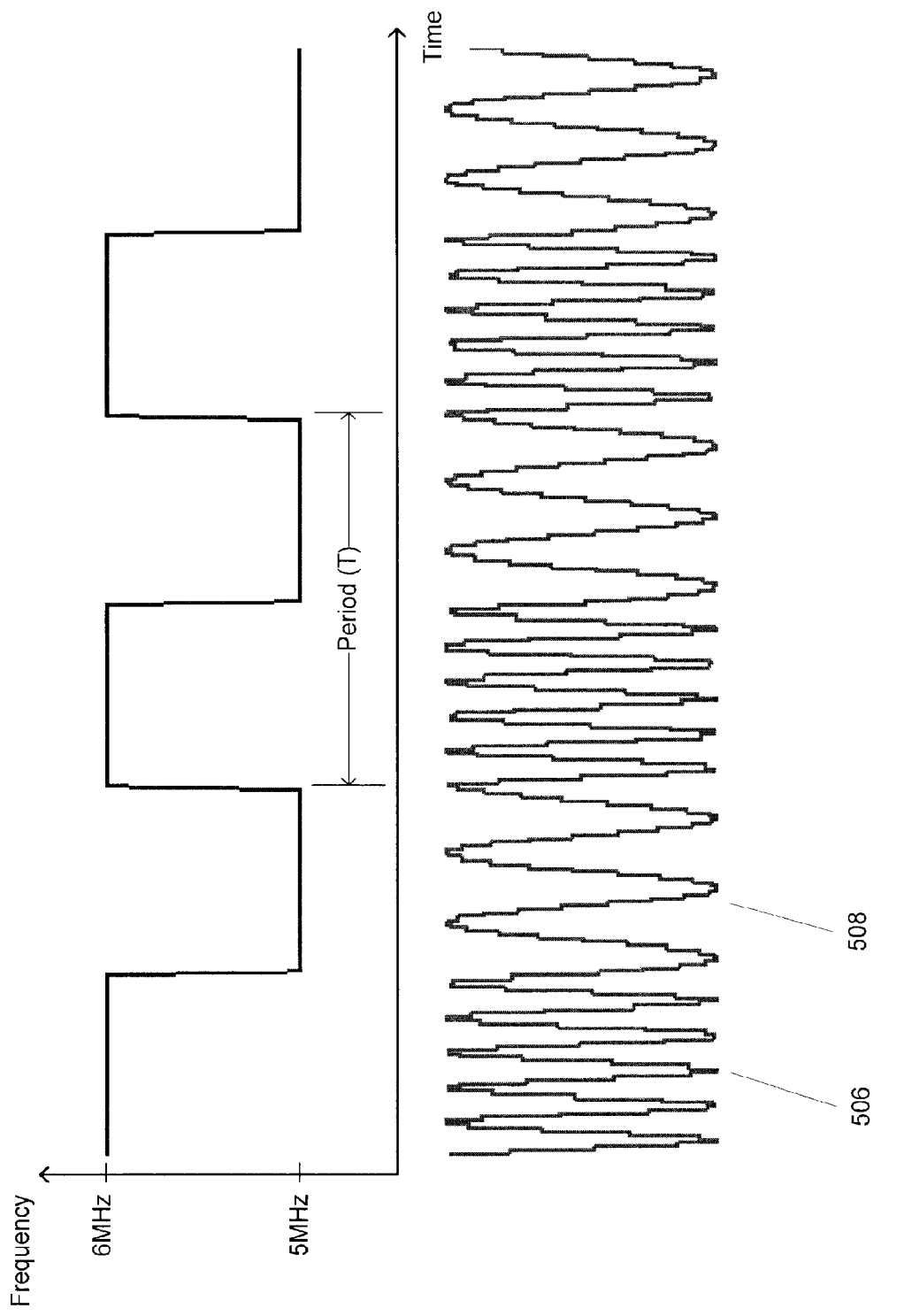
FIG. 5B illustrates a two-tone signal according to one embodiment.

FIG. 5B illustrates a two-tone signal according to one embodiment. In one embodiment, the preamble signal includes the two-tone signal. Two or more bursts are included in the preamble of every frame. Each burst may start with a frequency equal to a predetermined value, which represents a first tone 506. The predetermined value may be equal to a predetermined lowest channel bandwidth, for example as specified by a predetermined broadcasting standard (e.g., 5 MHz). A second tone 508 has a frequency equal to the channel bandwidth. The period T may be chosen to be equal to $$T = \frac{\text{Channel Bandwidth}}{\text{Sampling Frequency value}}.$$

For example, $$T = \frac{6}{(48/7)} = 0.875 \text{ μs}.$$

As another example, if the channel bandwidth that needs to be transmitted to the receiver is 20 MHz and the sampling frequency is 48/7 MHz, then the period is chosen as $$T = \frac{20}{(48/7)} = 2.91 \text{ μs}.$$

The chirp signal is repeated every COFDM frame according to one embodiment. The preamble also contains data to indicate the type of data transmitted for example, audio, video, and WiFi. The chirp signal may be inserted before or after the preamble of signaling data included in the preamble. The chirp signal may be also generated using analog circuitry.

Figure 6:
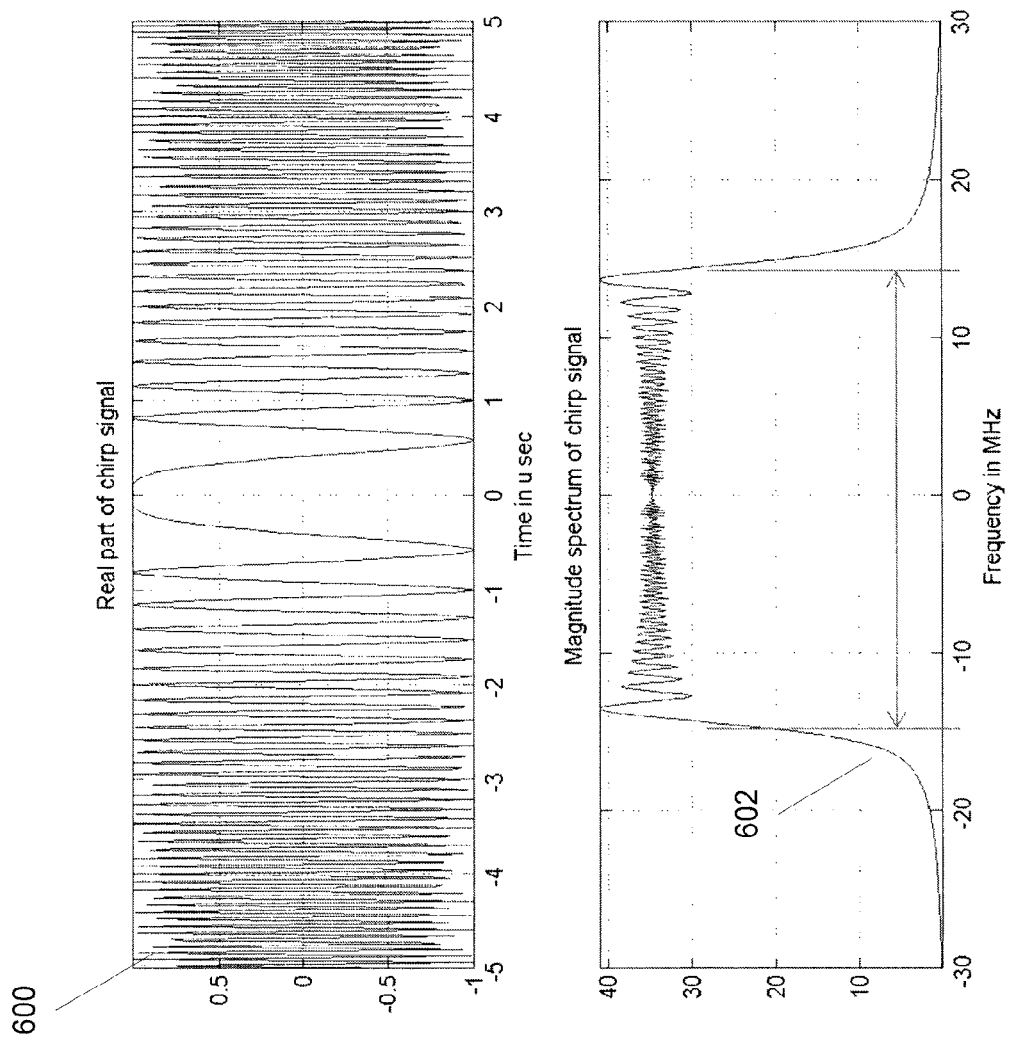
FIG. 6 illustrates a time domain and magnitude spectrum of a chirp signal according to one embodiment.

FIG. 6 illustrates a time domain and magnitude spectrum of a chirp signal according to one embodiment. The chirp signal is an FM signal with linear frequency modulation. The reception apparatus include a FM demodulator tuned to the low 'chirp' frequency (5 MHz) to extract the 'chirp' and recover the channel bandwidth and the sampling frequency. Trace 600 shows the real part of the chirp signal. Trace 602 shows the magnitude spectrum of the chirp signal in the frequency domain. The limits indicated in trace 602 show the portion used for the channel bandwidth estimation.

Figure 7:
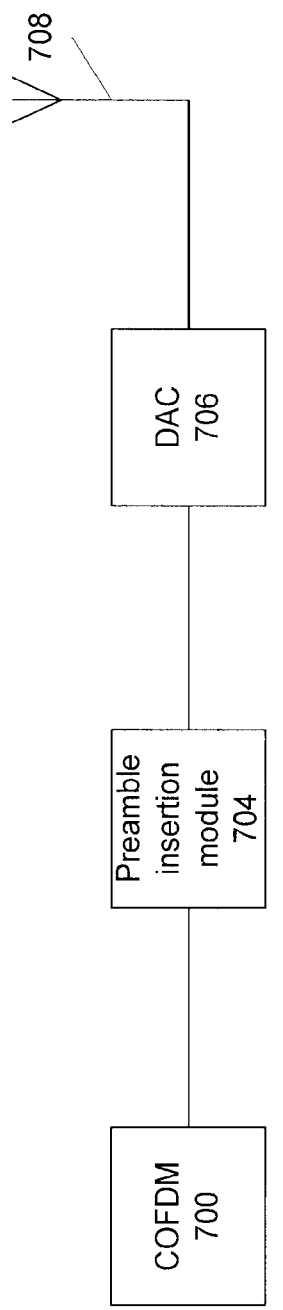
FIG. 7 is a block diagram of an exemplary transmission apparatus.

FIG. 7 illustrates a block diagram of a transmission apparatus. The transmission apparatus may be used, for example, to transmit video images and audio signals in accordance with the proposed ATSC 3.0 standard, DVB-T, Digital Video Broadcasting for Handhelds (DVB-H), DVB-T2, or DVB-C2 standards. The transmission apparatus includes a COFDM modulator 700, a preamble insertion module 704, a DAC 706, and an antenna 708. The COFDM modulator 700 is further illustrated in FIG. 8. The preamble insertion module 704 inserts the system parameters including the a-priori information signal. The digital signal is transformed into an analog signal by the DAC 706 and then modulated to radio frequency. In other embodiments, the a-priori information is inserted as an analog signal after the DAC 706. For example, a chirp signal representing the a-priori information is inserted into the analog signal according to a predetermined timing.

Figure 8:
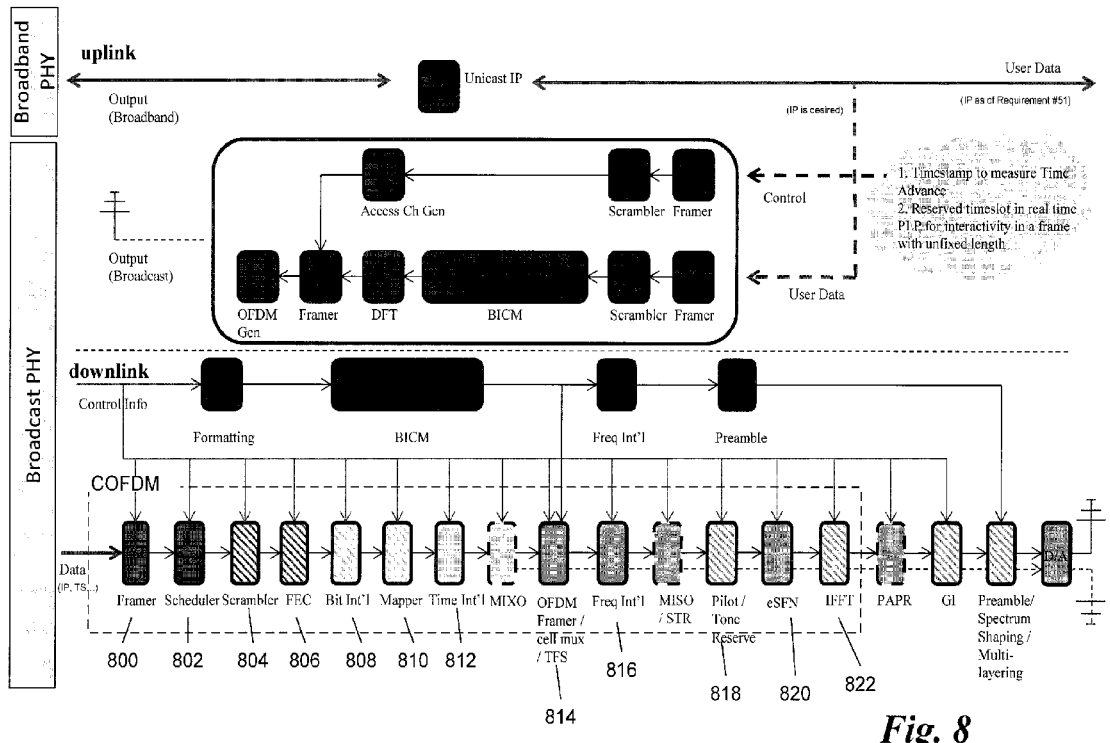
FIG. 8 illustrates a proposed ATSC 3.0 physical layer architecture according to one embodiment.

FIG. 8 illustrates an ATSC 3.0 physical layer architecture according to one embodiment. ATSC 3.0 is expected to improve and add functionality for broadcast television. A framer 800 combines multiple input streams into a frame with many physical layers or pipes. The scheduler 802 and scrambler 804 place the frames in a selected order and scrambles data per pipe. A forward error correction unit 806 adds information data protection per pipe. A bit interleaver 808 randomizes data bit placement within a pipe to reduce a channel's effect. A mapper unit 810 assigns a group of data bits to a symbol per pipe. A time interleaver unit 812 randomizes symbols per pipe to reduce the channel's effect. An OFDM framer 814 combines multiple inputs into a single stream and format it is frames. A frequency interleaver randomizes data cells to reduce the channel's effect. A pilots insertion unit inserts pilots and reserved tones for channel estimation and synchronization. Then, the preamble that includes the a-priori information may be inserted. An IFFT unit 822 generates the COFDM waveform. The GI insertion unit inserts a repeated portion of the COFDM waveform. The guard interval is used to combat ISI and inter-carrier interference (ICI) caused by delay spread in a communication channel. The GI length may be chosen to match the level of multipath expected. For example, in digital audio broadcasting (DAB), the guard interval length is chosen as one fourth of the receiver integration period. DVB-H and ISDB-T support four different guard lengths of ¼, ⅛, 1/16, and 1/32 of a COFDM symbol or frame data. Control information provides the COFDM with parameters. For example, the control information may indicate the level of protection for certain data. The modulation type is then chosen according to the level of protection. For example, for high protection the modulation type is chosen as QPSK.

Figure 9:
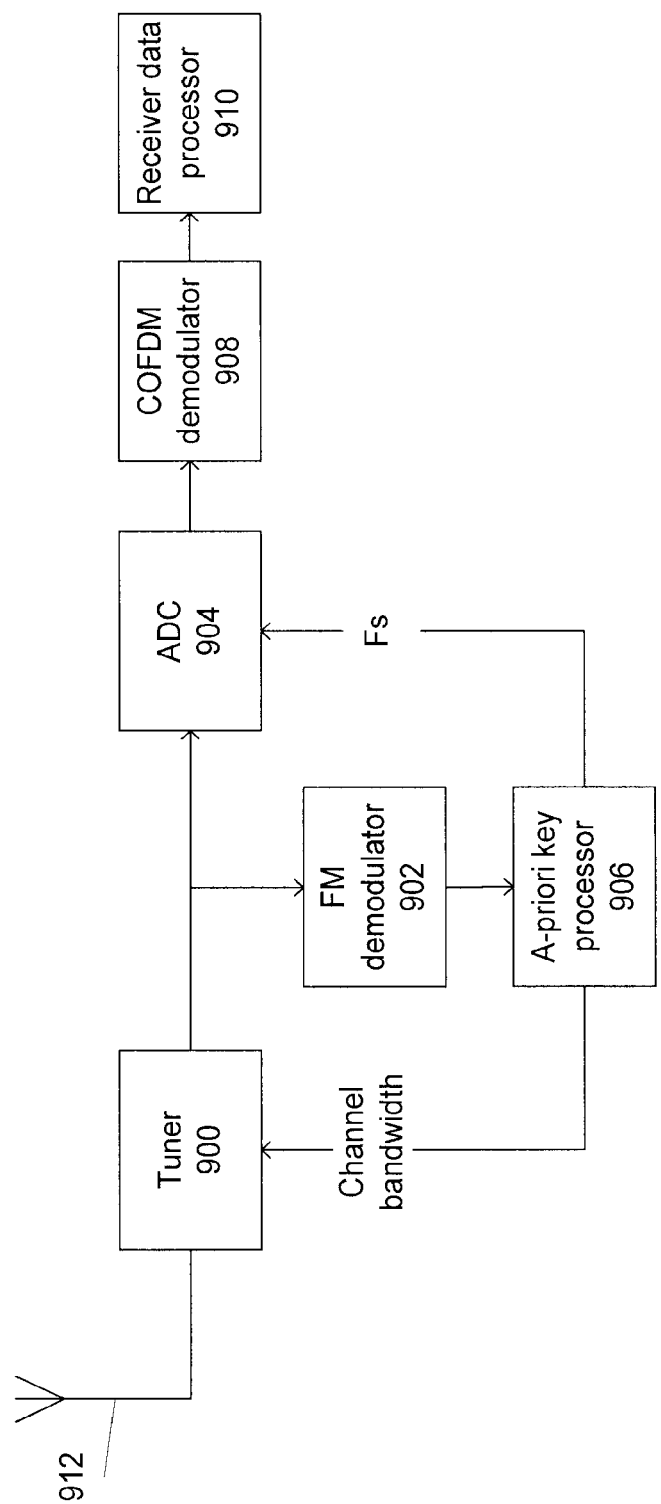
FIG. 9 is a block diagram of exemplary receiver circuitry of a reception apparatus.

FIG. 9 is a block diagram of exemplary receiver circuitry of a reception apparatus. In one embodiment, the receiver circuitry is part of a digital television receiver device that is incorporated into a fixed or mobile device such as a television set, a set top box, smartphone, tablet computer, laptop, portable computer, or any other device configured to receive television content. The receiver circuitry receives a digital television broadcast signal from one or more transmission apparatuses via, for example, a terrestrial broadcast.

An antenna 912 receives the modulated signal from the transmission apparatus described in FIG. 7 and provides the modulated signal to a tuner 900. An FM demodulator 902 is tuned to a predetermined channel bandwidth. The predetermined channel bandwidth is stored in a memory. The predetermined channel bandwidth may be the low 'chirp' frequency. In other embodiments, the FM demodulator 902 may step through frequencies to find the channel bandwidth. The output of the FM demodulator 902 shows an offset. The offset indicates the actual channel bandwidth. For the example, as discussed above, the offset is equal to 6 MHz, which indicates that the channel bandwidth is 6 MHz. In another embodiment, instead of an offset, the maximum frequency itself indicates the actual channel bandwidth.

The output of the FM demodulator 902 is fed to an a-priori key processor 906. The a-priori key processor 906 extracts the signal period to deduce the sampling frequency. The a-priori key processor 906 outputs the channel bandwidth to the tuner 900 and the sampling frequency to the ADC 904. The a-priori key processor may use a K-map table stored in the memory to find the sampling frequency and channel bandwidth. An exemplary k-map table is shown below.

TABLE 1

K-map table for sampling frequency retrieval

| | | Frequency (MHz) | |
|---|---|---|---|
| | | 6 | 20 |
| T | 0.875 | Fs = 48/7 MHz, BW = 6 MHz | Fs = 22.85 MHz, BW = 20 MHz |
| | 2.91 | Fs = 2.06 MHz, BW = 6 MHz | Fs = 48/7 MHz, BW = 20 MHz |

The FM demodulator 902 may also accumulate two or more bursts, for example, in the case of a low energy channel, which permits operation close to the noise level. The sampling frequency is calculated from the period as explained above. The sampling frequency is used by an analog-to digital converter (ADC) 904 to convert the COFDM signal into a digital form.

A COFDM demodulator 908 detects the guard interval for the COFDM transmission in order to place an FFT window in each COFDM symbol period. In the COFDM demodulator 908, a FFT unit performs an FFT on the COFDM symbols received and provides frequency domain symbols. Then a receiver (Rx) data processor 910 processes (e.g., symbol demaps, deinterleaves, and decodes) the data symbol estimates and provides decoded data. Although not shown in FIG. 9, the receiver circuitry may include other processing units for timing acquisition, filtering, sample rate conversion, direct current (DC) offset removal, frame detection, frame synchronization, and/or other functions.

In selected embodiments, amplitude diversity also known as antenna diversity may be used with COFDM. Antenna diversity is any one of several wireless diversity schemes that use two or more antennas to improve the quality and reliability of a wireless link. The channel bandwidth and the sampling frequency may be coded in the L1-Pre signaling part of the COFDM signal. The preamble may be coded using a QPSK (e.g., using the in-phase components of QPSK only, that is BPSK to send codes of the sampling frequency and channel bandwidth) scheme with ½ code rate forward error correction (FEC). The channel bandwidth and the sampling frequency may be coded with a small amount of bits.

Figure 10:
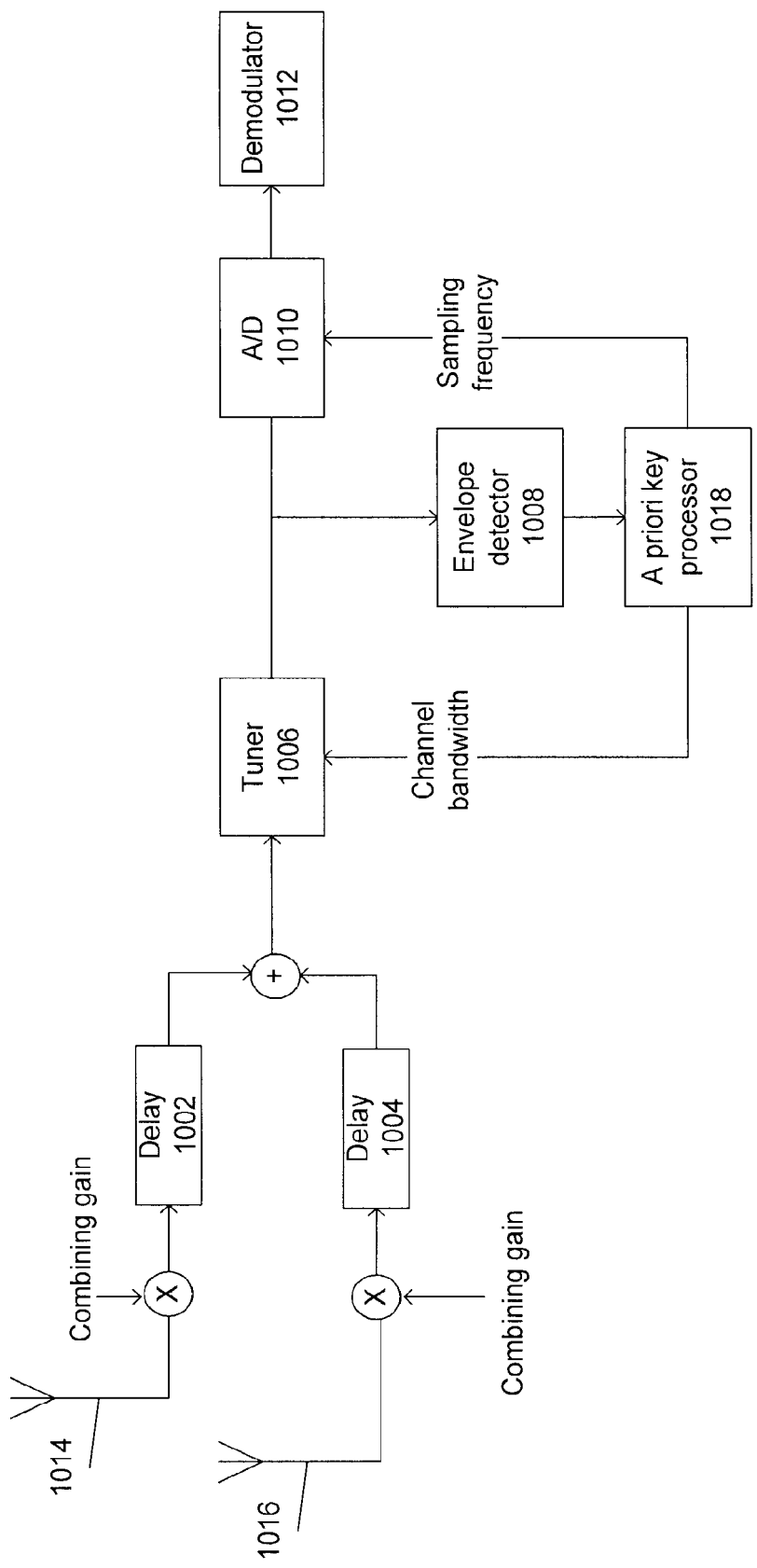
FIG. 10 is a block diagram representation of exemplary receiver circuitry of a reception apparatus using amplitude diversity.

FIG. 10 is a block diagram of an exemplary receiver circuitry of a reception apparatus using amplitude diversity. FIG. 10 shows two antennas 1014, 1016. Antennas 1014, 1016 continuously receive a signal from a transmission apparatus. Although two antennas are shown in FIG. 10, the receiver circuitry using amplitude diversity may include two or more antennas. The signal from each antenna may be multiplied by a combining gain. The combining gain may be made proportional to the rms signal level and inversely proportional to the mean square noise level in that channel. Each of the signals received by antennas 1014, 1016 then has a different combining gain. In other embodiments, the combination gain for all signals may set to the same value and not changed thereafter. The signals are then co-phased using delays 1002, 1004 prior to summing in order to ensure that all signals are added in phase for maximum diversity gain. The summed signals are then used as the received signal. Further, in one embodiment, amplitude diversity is not required and only a single antenna is used. The received signal is then fed to the tuner 1006. To retrieve the quadrature phase, from the received signal, a Hilbert transform may be used. The Hilbert transform shifts the received signal 90 degrees and retrieves the quadrature-phase samples from the in-phase samples. In order to avoid using a digital Hilbert transform unit, the in-phase samples from the received signal should be used in one embodiment. Then, the signal output from the tuner 1006 is fed to an envelope detector 1008. The envelope detector 1008 is an electronic circuit that takes a high frequency signal as input and provides an output which is the envelope of the original signal. The envelope detector 1008 may include a diode feeding an LC circuit. The diode may be connected to a resistor and a capacitor in parallel from the output of the circuit to a ground. The output from the envelope detector 1008 will be "1" or "0".

The output from the envelope detector 1008 is fed to a-priori key processor 1018. The a-priori key processor 1018 retrieves the coded channel bandwidth and the sampling frequency as the output from the envelope detector is the binary representation of the sampling frequency and the channel bandwidth. Once the coded channel bandwidth and sampling frequency are retrieved from the a-priori key processor 1008, the one or more codes are compared with a look-up table stored in the memory to retrieve the channel bandwidth and the sampling frequency. In one embodiment, 5 BPSK symbols may be used to represent the sampling frequency and 5 BPSK symbols may be used to represent the channel bandwidth. Thus, a first look-up table with 32 entries (2^5) may be used to retrieve the sampling frequency. Similarly, a second look-up table with 32 entries (2^5) may be used to retrieve the channel bandwidth. The channel bandwidth is then fed to the tuner 1006 to retrieve the signal. The sampling frequency is fed to the ADC 1010. The output from the ADC 1010 is fed to the demodulator 1012.

The receiver circuitry illustrated in FIGS. 9 and 10 generally operate under control of at least one processor, such as a CPU, which is coupled to memory, program memory, and a graphics subsystem via one or more buses. An exemplary computer for controlling the receiver circuitry is further described below with respect to FIG. 12.

Figure 11:
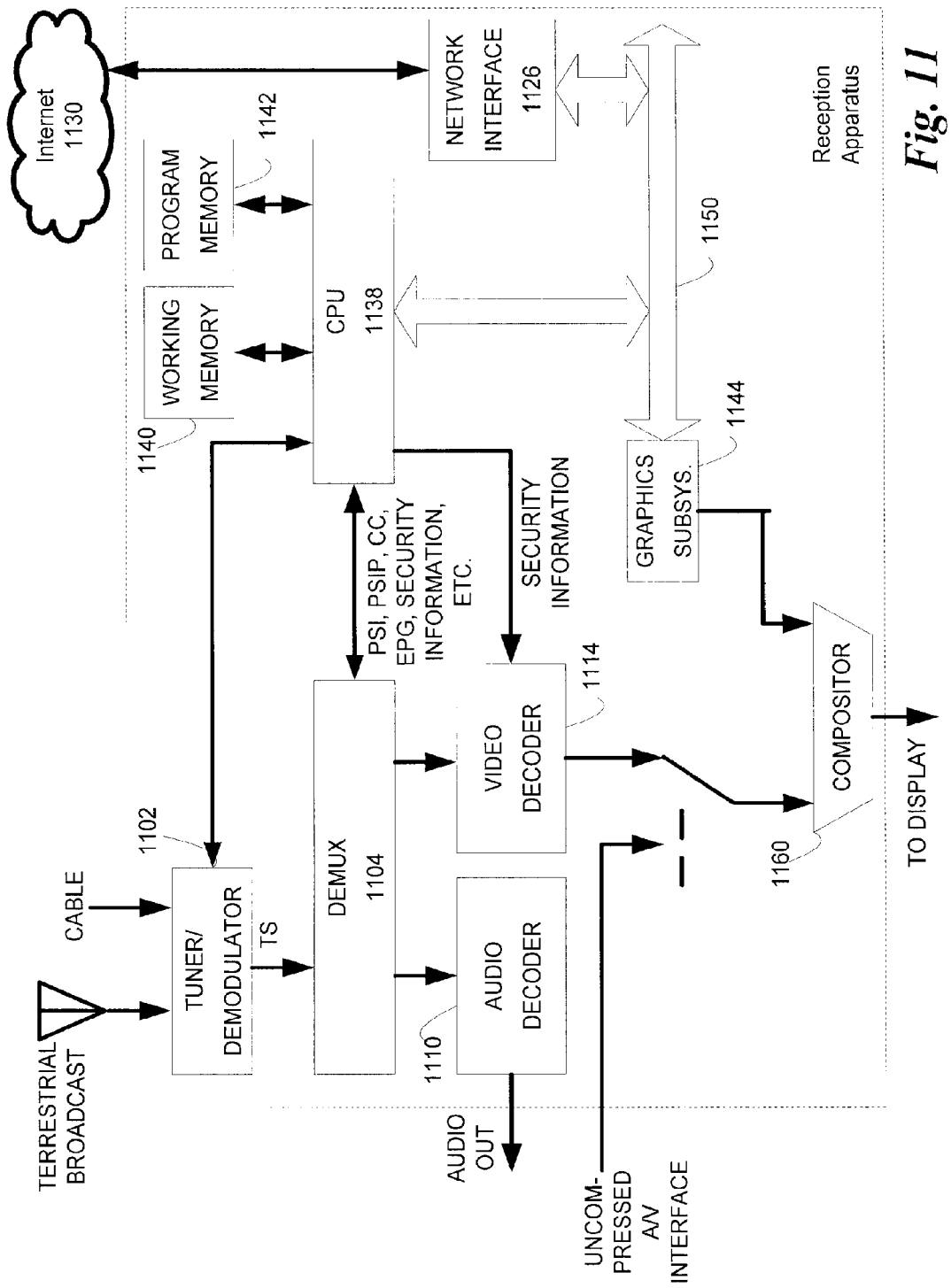
FIG. 11 illustrates an exemplary reception apparatus.

FIG. 11 illustrates an exemplary reception apparatus. The reception apparatus includes a digital television receiver device that is incorporated into a fixed or mobile device such as a television set, a set top box, smartphone, tablet computer, laptop, portable computer, or any other device configured to receive television content.

The reception apparatus includes a tuner/demodulator 1102, which receives digital television broadcast signals from one or more content sources (e.g., content source) via, for example, a terrestrial broadcast. The tuner/demodulator 1102 includes one of the receiver circuitry illustrated in FIG. 9 or 10 in certain embodiments. Depending on the embodiment, the reception apparatus may alternatively or additionally be configured to receive a cable television transmission or a satellite broadcast. The tuner/demodulator 1102 receives a signal, including for example an MPEG-2 TS or IP packets, which may be demultiplexed by the demultiplexer 1104 or handled by middleware and separated into audio and video (A/V) streams. The audio is decoded by an audio decoder 1110 and the video is decoded by a video decoder 1114. Further, uncompressed A/V data may be received via an uncompressed A/V interface (e.g., a HDMI interface), if available.

In one embodiment, the received signal (or stream) includes supplemental data such as one or a combination of closed caption data, a triggered declarative object (TDO), a trigger, a virtual channel table, EPG data, NRT content, etc. Examples of the TDO and trigger are described in ATSC Candidate Standard: Interactive Services Standard (A/105: 2014), S13-2-389r7, which is incorporated herein by reference in its entirety. The supplemental data are separated out by the demultiplexer 1104. However, the A/V content and/or the supplemental data may be received via the Internet 1130 and a network interface 1126.

A storage unit may be provided to store non real time content (NRT) or Internet-delivered content such as Internet Protocol Television (IPTV). The stored content can be played by demultiplexing the content stored in the storage unit by the demultiplexer 1104 in a manner similar to that of other sources of content. Alternatively, the stored content may be processed and presented to the user by the CPU 1138. The storage unit may also store any other supplemental data acquired by the reception apparatus.

The reception apparatus generally operates under control of at least one processor, such as the CPU 1138, which is coupled to a working memory 1140, program memory 1142, and a graphics subsystem 1144 via one or more buses (e.g., bus 1150). The CPU 1138 receives closed caption data from the demultiplexer 1104 as well as any other supplemental data used for rendering graphics, and passes appropriate instructions and data to the graphics subsystem 1144. The graphics outputted by the graphics subsystem 1144 are combined with video images by the compositor and video interface 1160 to produce an output suitable for display on a video display.

Further, the CPU 1138 operates to carry out functions of the reception apparatus including the processing of NRT content, triggers, TDOs, EPG data, etc. For example, the CPU 1138 operates to execute script objects (control objects) contained in the TDO, its trigger(s), etc., using for example a Declarative Object (DO) Engine stored in the program memory 1142.

Although not illustrated in FIG. 11, the CPU 1138 may be coupled to any one or a combination of the reception apparatus resources to centralize control of one or more functions. In one embodiment, the CPU 1138 also operates to oversee control of the reception apparatus including the tuner/demodulator 1102 and other television resources.

Figure 12:
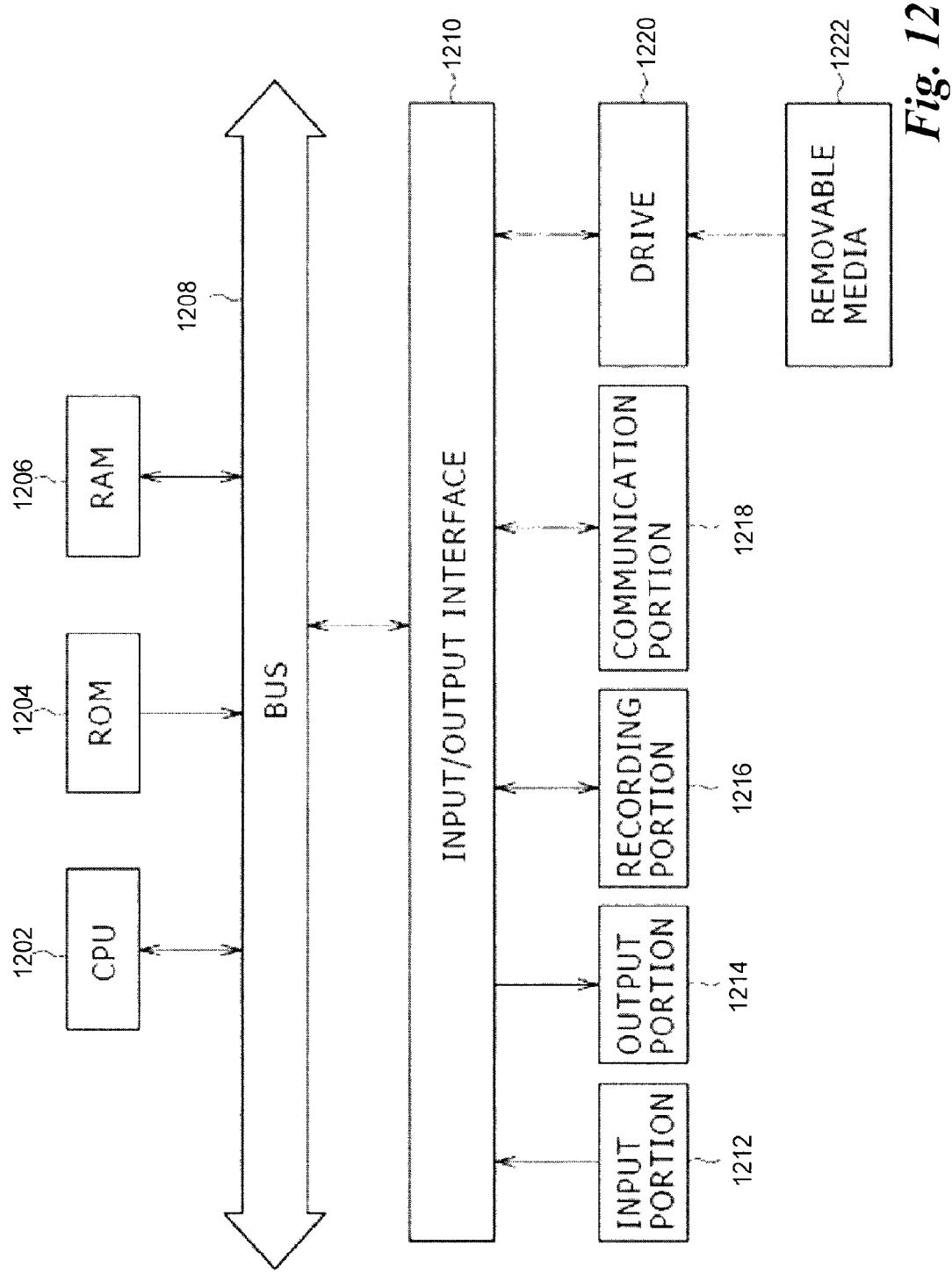
FIG. 12 is a block diagram showing an example of a hardware configuration of a computer.

FIG. 12 is a block diagram showing an example of a hardware configuration of a computer that can be configured to perform functions of any one or a combination of reception apparatus and transmission apparatus. For example, in one embodiment, the computer is configured to perform the functions in the digital domain, such as the COFDM modulator 700, preamble insertion module 704, COFDM demodulator 908, a priori key processor 906 and receiver data processor 910.

As illustrated in FIG. 12 the computer includes a central processing unit (CPU) 1202, read only memory (ROM) 1204, and a random access memory (RAM) 1206 interconnected to each other via one or more buses 1208. The one or more buses 1208 are further connected with an input-output interface 1210. The input-output interface 1210 is connected with an input portion 1212 formed by a keyboard, a mouse, a microphone, remote controller, etc. The input-output interface 1210 is also connected an output portion 1214 formed by an audio interface, video interface, display, speaker and the like; a recording portion 1216 formed by a hard disk, a non-volatile memory or other non-transitory computer readable storage medium; a communication portion 1218 formed by a network interface, modem, USB interface, fire wire interface, etc.; and a drive 1220 for driving removable media 1222 such as a magnetic disk, an optical disk, a magneto-optical disk, a semiconductor memory, etc.

According to one embodiment, the CPU 1202 loads a program stored in the recording portion 1216 into the RAM 1206 via the input-output interface 1210 and the bus 1208, and then executes a program configured to provide the functionality of the one or combination of the content source, the reception apparatus, and the transmission apparatus.

A method which includes the features in the foregoing description provides numerous advantages. In particular, the method and apparatus determines the channel bandwidth and the sampling frequency from the preamble signal. The present disclosure has the advantage of not requiring the a-priori knowledge of the sampling frequency and the channel bandwidth. The broadcaster may easily change the bandwidth by changing the chirp signal. The reception apparatus may receive broadcasting signals with a plurality of channel bandwidths. The broadcaster has the flexibility to control the channel bandwidth.

As described above, embodiments of the present disclosure include a plurality of different ways for generating a-priori keys, including the use of a 'chirp' frequency and amplitude diversity. In certain embodiments, the 'chirp' frequency implementation spans the channel raster to mitigate frequency fading, is located in every preamble to mitigate dropouts in time, allows for a simple FM demodulator at a receiver to extract a-priori information of channel bandwidth and sampling frequency, and may allow accumulated correlations to build up information out of the noise due to the repetitive nature of same data.

Further, in certain embodiments, for the amplitude diversity implementation, the QPSK modulated data with code rate ½ protected signaling may be done digitally, delay and multiply circuits can be done to extract this data before an A/D, and may allow accumulated correlations to build up information out of the noise due to the repetitive nature of same data. Moreover, embodiments of the present disclosure provide a manner of standardizing signal starting points to enable full flexibility for future growth, providing such signaling in a compact way to reduce overhead, and signaling starting point options before the digital samples are taken at receivers.

Numerous modifications and variations of the present disclosure are possible in light of the above teachings. It is therefore to be understood that within the scope of the appended claims, the present disclosure may be practiced otherwise than as specifically described herein.

The above disclosure also encompasses the embodiments noted below.

The above disclosure also encompasses the embodiments noted below.

(1) A method for transmitting a-priori information, the method including generating, by circuitry of a transmission apparatus, the a-priori information based on a sampling frequency and a channel bandwidth of a signal to be transmitted; appending, by the circuitry, the a-priori information to a data signal; and transmitting, by the circuitry, the data signal including the appended a-priori information to a reception apparatus.

(2) The method of feature (1), in which the step of generating includes generating a chirp signal that represents the a-priori information, the chirp signal including at least one burst with a chirp rate equal to the sampling frequency and with a maximum frequency equal to the channel bandwidth.

(3) The method of feature (2), in which the chirp signal includes at least two identical bursts.

(4) The method of feature (3), in which the beginning of one of the at least two identical bursts is detected by a change in frequency between two of the at least two identical bursts.

(5) The method of any of features (2) to (4), in which the chirp signal is appended to a COFDM frame.

(6) The method of feature (5), in which the chirp signal is appended to a preamble of the COFDM frame.

(7) The method of feature (1), in which the step of generating includes generating binary code that represents the a-priori information, including the sampling frequency and the channel bandwidth; and setting a phase of a continuous pilot based on the binary code.

(8) The method of feature (7), in which the a-priori information is coded and accumulated in time with a Gold code.

(9) A method for receiving a-priori information, the method including receiving, by circuitry of a reception apparatus, a transmitted signal, the transmitted signal including a-priori information appended to a data signal; detecting, by the circuitry, the a-priori information included in the transmitted signal; and determining a sampling frequency and a channel bandwidth associated with the transmitted signal based on the detected a-priori information.

(10) The method of feature (9), further including adjusting a tuner that receives the transmitted signal based on the determined channel bandwidth; and performing analog to digital conversion of the received signal based on the determined sampling frequency.

(11) The method of feature (9) or (10), in which the step of detecting includes detecting a chirp signal that represents the a-priori information, the chirp signal including at least one burst with a chirp rate equal to the sampling frequency and with a maximum frequency equal to the channel bandwidth.

(12) The method of feature (11), in which the step of detecting includes performing FM demodulation of the transmitted signal.

(13) The method of feature (11), in which the chirp signal includes at least two identical bursts.

(14) The method of feature (13), in which the beginning of one of the at least two identical bursts is detected by a change in frequency between two of the at least two identical bursts.

(15) The method of any of features (11) to (14), in which the chirp signal is appended to a COFDM frame.

(16) The method of feature (15), in which the chirp signal is appended to a preamble of the COFDM frame.

(17) The method of feature (9), in which the step of detecting includes detecting a phase of a continuous pilot, comparing the phase of the continuous pilot with a previous data carrier, detecting a first code in response to determining that there is a phase change, detecting a second code in response to determining that there is no phase change, and retrieving one of the sampling frequency and the channel bandwidth using a look-up table based on the detected code.

(18) The method of feature (17), in which the detected code represents coded a-priori information, and the step of detecting the a-priori information further includes accumulating the detected code with a Gold code stored in a memory.

(19) A transmission apparatus, including circuitry configured to: generate a-priori information based on a sampling frequency and a channel bandwidth of a data signal to be transmitted; append the a-priori information to the data signal; and transmit the data signal including the appended a-priori information to a reception apparatus.

(20) The transmission apparatus of feature (19), in which the circuitry is configured to generate a chirp signal that represents the a-priori information, the chirp signal including at least one burst with a chirp rate equal to the sampling frequency and with a maximum frequency equal to the channel bandwidth.

(21) The transmission apparatus of feature (20), in which the chirp signal includes at least two identical bursts.

(22) The transmission apparatus of feature (21), in which the beginning of one of the at least two identical bursts is detected by a change in frequency between two of the at least two identical bursts.

(23) The transmission apparatus of any of features (20) to (22), in which the chirp signal is appended to a COFDM frame.

(24) The transmission apparatus of feature (23), in which the chirp signal is appended to a preamble of the COFDM frame.

(25) The transmission apparatus of feature (19), in which the circuitry is configured to generate a binary code that represents the a-priori information, including the sampling frequency and the channel bandwidth; and setting a phase of a continuous pilot based on the binary code.

(26) The transmission apparatus of feature (25), in which the a-priori information is coded and accumulated in time with a Gold code.

(27) A reception apparatus, including circuitry configured to: receive a transmitted signal, the transmitted signal including a-priori information appended to a data signal; detect the a-priori information included in the transmitted signal; and determine a sampling frequency and a channel bandwidth associated with the transmitted signal based on the detected a-priori information.

(28) The reception apparatus of feature (27), in which the circuitry is configured to adjust a tuner that receives the transmitted signal based on the determined channel bandwidth; and perform analog to digital conversion of the received signal based on the determined sampling frequency.

(29) The reception apparatus of feature (27) or (28), in which the circuitry is configured to detect a chirp signal that represents the a-priori information, the chirp signal including at least one burst with a chirp rate equal to the sampling frequency and with a maximum frequency equal to the channel bandwidth.

(30) The reception apparatus of feature (29), in which the circuitry is configured to perform FM demodulation of the transmitted signal.

(31) The reception apparatus of feature (30), in which the chirp signal includes at least two identical bursts.

(32) The reception apparatus of feature (31), in which the beginning of one of the at least two identical bursts is detected by a change in frequency between two of the at least two identical bursts.

(33) The reception apparatus of any of features (29) to (32), in which the chirp signal is appended to a COFDM frame.

(34) The reception apparatus of feature (33), in which the chirp signal is appended to a preamble of the COFDM frame.

(35) The reception apparatus of feature (27), in which the circuitry is configured to detect a phase of a continuous pilot, compare the phase of the continuous pilot with a previous data carrier, detect a first code in response to determining that there is a phase change, detect a second code in response to determining that there is no phase change, and retrieve one of the sampling frequency and the channel bandwidth using a look-up table based on the detected code.

(36) The reception apparatus of feature (35), in which the detected code represents coded a-priori information, and the step of detecting the a-priori information further includes accumulating the detected code with a Gold code stored in a memory.

The invention claimed is:

1. A method for transmitting a-priori information, the method comprising:
   generating, by circuitry of a transmission apparatus, binary code that represents the a-priori information based on a sampling frequency and a channel bandwidth of a data stream included in a digital television broadcast signal to be transmitted;
   generating, by the circuitry, the digital television broadcast signal including a continuous pilot that is set to signal the binary code that represents the a-priori information and including the data stream, a phase change between the continuous pilot and a previous data carrier being set to signal the binary code; and
   transmitting, by a transmitter, the digital television broadcast signal including the continuous pilot that is set to signal the binary code that represents the a-priori information and including the data stream to a reception apparatus.

2. The method of claim 1, wherein the a-priori information is coded and accumulated in time with a Gold code.

3. A method for receiving a-priori information, the method comprising:
   receiving, by a receiver of a reception apparatus, a digital television broadcast signal including a continuous pilot that is set to signal a binary code that represents a-priori information and including a data stream associated with the a-priori information, a phase change between the continuous pilot and a previous data carrier being set to signal the binary code;
   detecting, by circuitry of the reception apparatus, the binary code that represents the a-priori information based on the phase change between the continuous pilot and the previous data carrier; and
   determining, by the circuitry, a sampling frequency and a channel bandwidth associated with the data stream included in the digital television broadcast signal based on the detected binary code that represents the a-priori information, wherein
   the binary code that represents the a-priori information included in the digital television broadcast signal is generated based on the sampling frequency and the channel bandwidth of the data stream included in the digital television broadcast signal.

4. The method of claim 3, further comprising:
   adjusting a tuner of the receiver that receives the digital television broadcast signal based on the determined channel bandwidth; and
   performing analog to digital conversion of the received digital television broadcast signal based on the determined sampling frequency.

5. The method of claim 3, wherein the step of detecting comprises:
   detecting whether there is a phase change between the continuous pilot and the previous data carrier,
   detecting a first code in response to determining that there is the phase change,
   detecting a second code in response to determining that there is no phase change, and
   retrieving one of the sampling frequency and the channel bandwidth using a look-up table based on which of the first and second codes is detected.

6. The method of claim 5, wherein
   the detected one of the first and second codes represents coded a-priori information, and
   the step of detecting the a-priori information further includes accumulating the detected one of the first and second codes with a Gold code stored in a memory.

7. A transmission apparatus, comprising:
   circuitry configured to:
   generate binary code that represents a-priori information based on a sampling frequency and a channel bandwidth of a data stream included in digital television broadcast signal to be transmitted;
   generate the digital television broadcast signal including a continuous pilot that is set to signal the binary code that represents the a-priori information and including the data stream, a phase change between the continuous pilot and a previous data carrier being set to signal the binary code; and
   a transmitter configured to transmit the digital television broadcast signal including the continuous pilot that is set to signal the binary code that represents the a-priori information and including the data stream to a reception apparatus.

8. A reception apparatus, comprising:
   a receiver configured to receive a digital television broadcast signal including a continuous pilot that is set to signal a binary code that represents a-priori information and including a data stream associated with the a-priori information, a phase change between the continuous pilot and a previous data carrier being set to signal the binary code; and
   circuitry configured to:
   detect the binary code that represents the a-priori information based on the phase change between the continuous pilot and the previous data carrier; and determine a sampling frequency and a channel bandwidth associated with the data stream included in the digital television broadcast signal based on the detected binary code that represents the a-priori information, wherein the binary code that represents the a-priori information included in the digital television broadcast signal is generated based on the sampling frequency and the channel bandwidth of the data stream included in the digital television broadcast signal.

9. A method for transmitting a-priori information, the method comprising:

generating, by circuitry of a transmission apparatus, the a-priori information based on a sampling frequency and a channel bandwidth of a data stream included in a digital television broadcast signal to be transmitted;

generating, by the circuitry, the digital television broadcast signal including the a-priori information and the data stream; and transmitting, by a transmitter, the digital television broadcast signal including the a-priori information and the data stream to a reception apparatus, wherein the a-priori information includes one or more codes that are defined in a look-up table which associates the one or more codes to the sampling frequency and the channel bandwidth, and the reception apparatus processes the data stream included in the digital television broadcast signal based on the sampling frequency and the channel bandwidth indicated in the a-priori information.

10. A method for receiving a-priori information, the method comprising:

receiving, by a receiver of a reception apparatus, a digital television broadcast signal including a-priori information and a data stream associated with the a-priori information;

detecting, by circuitry of the reception apparatus, the a-priori information included in the digital television broadcast signal;

determining, by the circuitry, a sampling frequency and a channel bandwidth associated with the data stream included in the digital television broadcast signal based on the detected a-priori information; and processing the received data stream included in the digital television broadcast signal based on the sampling frequency and the channel bandwidth indicated in the a-priori information, wherein the a-priori information includes one or more codes that are defined in a look-up table which associates the one or more codes to the sampling frequency and the channel bandwidth.

11. A transmission apparatus, comprising:

circuitry configured to:

generate a-priori information based on a sampling frequency and a channel bandwidth of a data stream included in a digital television broadcast signal to be transmitted; and generate the digital television broadcast signal including the a-priori information and the data stream; and a transmitter configured to transmit the digital television broadcast signal including the data stream and the a-priori information to a reception apparatus, wherein the a-priori infossnation includes one or more codes that are defined in a look-up table which associates the one or more codes to the sampling frequency and the channel bandwidth, and the reception apparatus processes the data stream included in the digital television broadcast signal based on the sampling frequency and the channel bandwidth indicated in the a-priori information.

12. The transmission apparatus of claim 7, wherein the a-priori information is coded and accumulated in time with a Gold code.

13. A reception apparatus, comprising:

a receiver configured to receive a digital television broadcast signal including a-priori information and a data stream associated with the a-priori information; and circuitry configured to:

detect the a-priori information included in the digital television broadcast signal;

determine a sampling frequency and a channel bandwidth associated with the data stream included in the digital television broadcast signal based on the detected a-priori information; and process the data stream included in the digital television broadcast signal based on the sampling frequency and the channel bandwidth indicated in the a-priori information, wherein the a-priori information includes one or more codes that are defined in a look-up table which associates the one or more codes to the sampling frequency and the channel bandwidth.

14. The reception apparatus of claim 8, wherein the circuitry is configured to adjust the receiver configured to receive the digital television broadcast signal based on the determined channel bandwidth; and perform analog to digital conversion of the received digital television broadcast signal based on the determined sampling frequency.

15. The reception apparatus of claim 8, wherein the circuitry is configured to detect whether there is a phase change between the continuous pilot and the previous data carrier, detect a first code in response to determining that there is the phase change, detect a second code in response to determining that there is no phase change, and retrieve one of the sampling frequency and the channel bandwidth using a look-up table based on which of the first and second codes is detected.

16. The reception apparatus of claim 15, wherein the detected one of the first and second codes represents coded a-priori information, and the circuitry is configured to detect the a-priori information based on an accumulation of the detected one of the first and second codes with a Gold code stored in a memory.

* * * * *